July 1, 1930. L. K. CHESWRIGHT 1,768,568
CLUTCH MECHANISM
Filed June 25, 1928 2 Sheets-Sheet 2

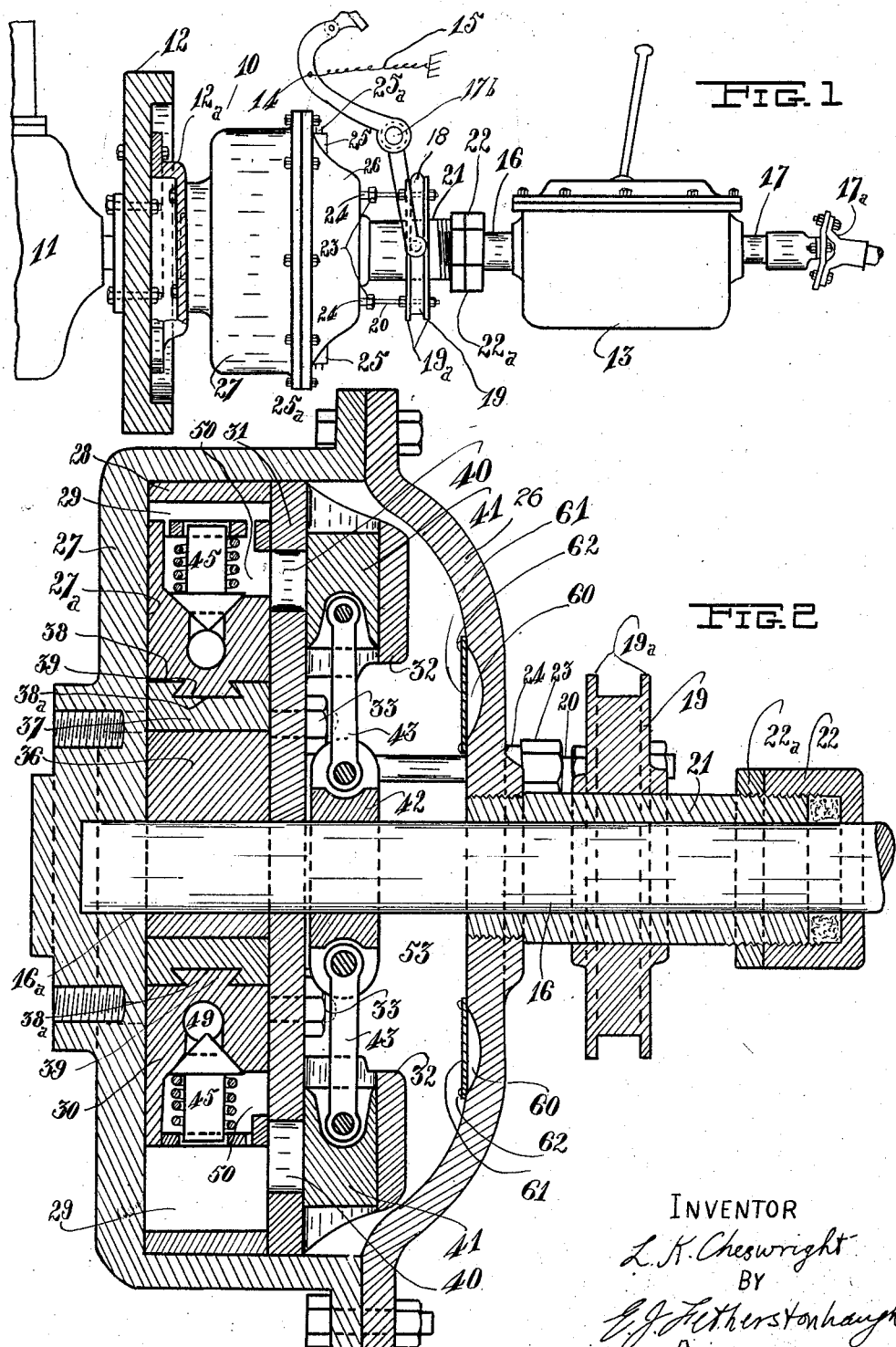

INVENTOR
L. K. Cheswright
BY
E. J. Fetherstonhaugh
ATTORNEY

Patented July 1, 1930

1,768,568

UNITED STATES PATENT OFFICE

LEONARD KEITH CHESWRIGHT, OF SMITHS FALLS, ONTARIO, CANADA, ASSIGNOR TO FLEXOIL TRANSMISSION LIMITED, OF TORONTO, ONTARIO, CANADA

CLUTCH MECHANISM

Application filed June 25, 1928, Serial No. 288,116, and in Canada September 10, 1927.

This invention relates to a clutch mechanism, as described in the present specification and illustrated in the accompanying drawings which form part of the same.

The invention consists essentially of the novel features pointed out broadly and specifically in the claims for novelty following a description containing an explanation in detail of an acceptable form of the invention.

The objects of the invention are to provide a clutch mechanism that may be applied to motor vehicles, hoist drums, or any clutch or power transmission where a change in the speed ratio between the driving and driven members may be desired; to provide a greater degree of flexibility between said members and a more absolute and convenient control of the speed ratios than heretofore attainable in the known forms of clutches; and to render unnecessary several different gear ratios or shifts in the transmission gear box of motor cars as now used, only one direct speed forward and one reverse being necessary in this invention.

In the drawings, Figure 1 is a fragmentary side view of the device as applied to a motor vehicle.

Figure 2 is a section view of part of the device.

Like numerals of reference indicate corresponding parts in the various figures.

Figure 3:
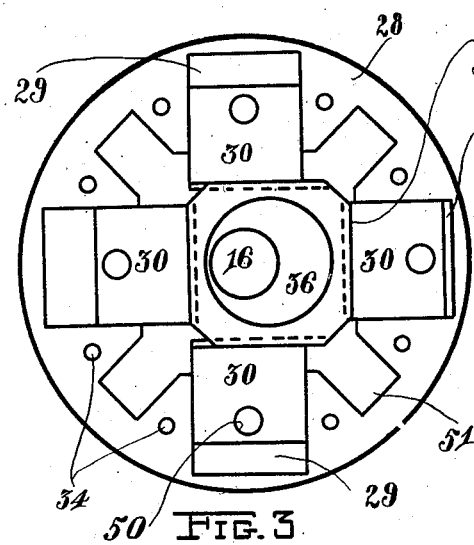
Figure 3 is an assembly view of the oil plungers, eccentric, eccentric ring and the mounting for said plungers.
Figure 4:
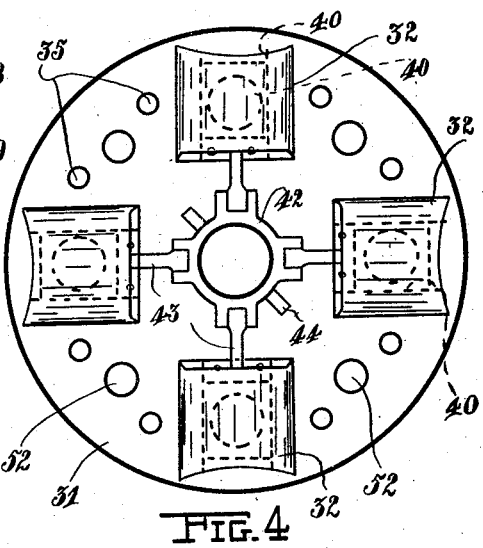
Figure 4 is a side elevation view of part of the oil flow controlling means.
Figure 5:
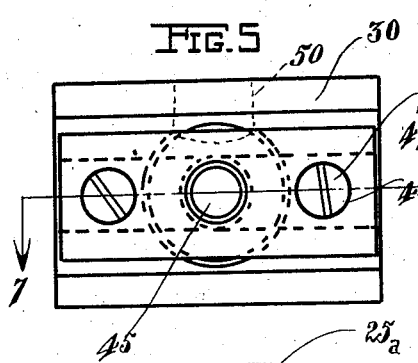
Figure 5 is an outside end view of one of the oil plungers.
Figure 7:
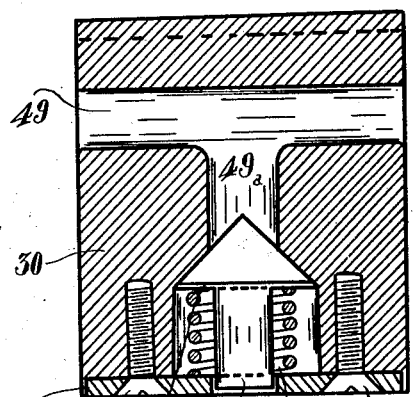
Figure 7 is a section view taken on line 7—7 in Figure 5.
Figure 6:
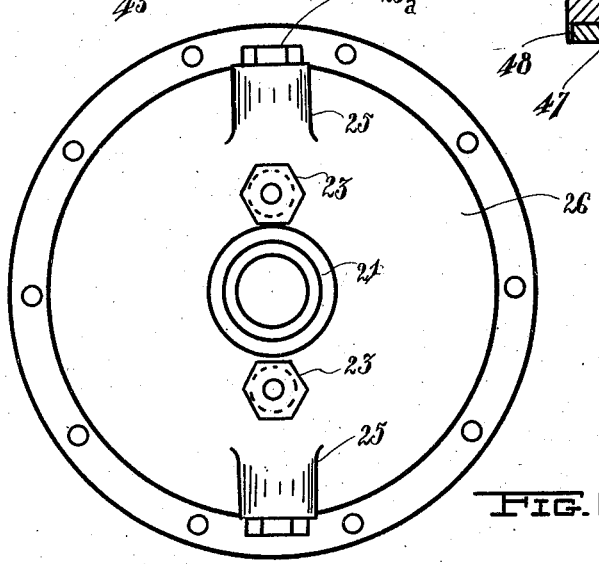
Figure 6 is a side elevation view of part of the housing of the device.

This invention may be applied to any form of power transmission where it is desirable to change the speed ratio between the driving and the driven members, but is especially adaptable to motor vehicles, replacing the usual friction clutch now used. It may be designed to replace the usual fly wheel by bolting it directly to the crank shaft instead of to the fly wheel.

Referring to the drawings, 10 indicates the device complete, being suitably bolted to fly wheel 12 of the motor 11. 13 is a transmission gear box connected to the device by the driving shaft 16 and having the usual drive shaft 17 and universal joint 17$^a$. The transmission is designed for one speed ahead and one speed reverse, also a neutral position. 14 is the usual clutch pedal arm fulcrumed at 17$^b$, and is connected by the usual means to the clutch collar 18 which acts on the shoulders 19$^a$ formed on the ring 19 connected to the oil flow controlling mechanism by the rods 20; the ring 19 is slidably mounted on the hollow shaft 21 and rotates therewith. 15 is a spring attached to the pedal 14 and to a fixed part of the automobile, and is tensioned to normally hold the pedal 14 so as to close the ports 40.

22 is a pack nut threaded onto the hollow shaft 21 to prevent leakage of oil around the shaft 16 which is journalled therein. 22$^a$ is a lock nut threaded on the shaft 21 before the nut 22 is threaded thereon and locking the nut 22 against rotation on the shaft 21.

Raised hollow portions 24 are formed on the rear part of the cover 26 of the housing 27 through which the rods 20 are sildably mounted. 23 are pack nuts threaded onto the raised hollow portions 24 to prevent leakage of oil around the rods 20.

The oil may be drained and replaced from time to time through the two filler holes 25 formed diametrically opposite on the rear part of the cover 26. The holes 25 are suitably sealed by the plugs 25$^a$ threaded therein.

The housing of the device consists essentially of the two parts 26 and 27, suitably bolted together as shown. The part 26 has the hollow shaft 21 tightly threaded into it, as best shown in Figures 1 and 2, and forms a support for said shaft. The hollow shaft 21 may be formed integral with the cover 26 but is preferably made as a separate shaft. The part 27 of the housing is bolted either directly to the crank shaft, or as is shown in Figure 1, to the fly wheel by means of the flange 12ª.

The plunger constraining member 28 has a plurality of recesses or races 29 formed therein, in which the plungers 30 slide. 31 is a plate having a plurality of raised cylindrically-shaped portions 32 formed on its outer face in which slide valves 41 are slidably mounted.

Suitably spaced bolts 33 threaded into the inner face 27ª of the housing 27 and passed through the holes 34 in the member 28 and the holes 35 in the plate 31, form means of suitably securing said members 28 and 31 to the face 27ª of the housing 27 and effectively preventing leakage of oil between either the plate 31 or the face 27ª and the member 28. The shaft 16 is suitably mounted and journalled at one end in the housing 27 as at 16ª.

36 is an eccentric, either formed on or suitably secured to the shaft 16 and rotating therewith. An eccentric ring or block 37 is rotatably mounted on the eccentric 36 and has four planed surfaces 38 pesented to each of the plungers 30. An under cut groove 38ª is formed on each planed surface 38 and a corresponding raised portion 39 is formed on each plunger 30 and slidably mounted in said groove, thus connecting said eccentric ring 37 to each plunger 30. It will be noted that when the shaft 16 is rotated, the eccentric will impart a reciprocating motion to the plungers 30 in the recesses 29.

40 are openings or ports formed in the plate 31 and forming a communication between each of the recesses or cylinders 29 and the oil-filled space 53. 42 is a ring loosely mounted on the shaft 16 and connected to each slide or piston valve 41 by means of the connecting rods 43 pivotally connected at one end to the ring and at the other end to the corresponding valve 41. 44 are pins formed on the ring 42 to which the rods 20 are suitably secured. A needle valve 45 is seated in an opening 49ª formed in each of the plungers 30. The valve is springheld in its closed position by the compression spring 46 bearing against the shoulder 45ª formed on the needle valve and the plate 48 secured to the end of the plunger by the screws 47. An opening 49 formed in the plunger 30 connects the opening 49ª with the recesses 51 formed in the member 28. A hole or opening 50 formed in the upper portion of the plunger connects the opening 49ª with the opening 40 former in the plate 31. 52 are holes formed in the plate 31 connecting the oil-filled recesses 51 formed in the member 28 and the oil-filled space 53 formed between the housing portion 26 and the plate 31. In order to allow for the expansion of the liquid in the space 53, a plurality of orifices 60 are formed in the inner face of the portion 26 of the housing at regular intervals and equidistant from the central axis.

A flexible plate or diaphragm 61 is placed over each of said orifices and sealed at the edges thereof and secured in place by the screws 62. When the liquid in the space 53 expands on being heated, the diaphragm is depressed into the orifice or depression 60.

Operation: The casing is filled with oil, the space 53, the ports 40, the cylinders 29, the holes 49, 49ª and 52 and the recesses 51 being completely filled, or in other words, all space within the casing being completely filled with oil. As the casing is rotated over the shaft 16, or in other words, as one is rotated relative to the other, the eccentric block 37 is rotated over the eccentric 36, causing the plungers 30 to reciprocate in their respective cylinders. The outward motion of each plunger is resisted by the oil contained in its corresponding cylinder, the resistance thus offered being determined by the rate of flow of the oil through the corresponding port 40. If the ports are closed, then the oil cannot escape through the ports into the space 53 and the eccentric block 37 becomes locked against any motion relative to the eccentric 36, thus rotating the eccentric and the shaft 16 therewith; in other words, when the ports are closed, the plungers cannot reciprocate in their cylinders and the shaft 16 or driven member rotates with the casing or driving member. If the ports are open, the oil in the cylinders will only resist the outward motion of the plungers to the extent of the resistance offered by the oil as it flows out through the ports and into the space 53.

Thus with the transmission in "forward" or "reverse" and the ports 40 closed, the clutch will transmit power from the driving to the driven member in the ratio of 1 to 1 or in the speed ratio of 1 to 1; as the ports are opened, the speed ratio is decreased according to the rate of flow of the oil through the ports, the torque capacity of the engine increasing accordingly. It will be seen here that whereas in the usual driving of motor vehicles, the speed ratio has to be changed when subjecting the engine to an increased torque, by means of the usual transmission—say from "third" to "first" and then to "third" again—this clutch is operated to simply open the ports 40 by pressing down or forwardly upon the pedal 14, thus decreasing the speed ratio; by next releasing the pedal gradually, the speed ratio between the driving and driven members is gradually increased and the torque accordingly decreased. As oil is forced into the oil-filled space 53 the excess oil in said space is forced out through the holes 52 and into the recesses 51. As the plungers recede in their cylinders, the oil in the spaces or holes 49 and 49ª forces its way into the cylinders through the valves 45, the spaces 49 being fed from the recesses 51.

What I claim is:

1. In a power transmission, a liquid-tight casing rotating with the crank shaft of an engine and forming the driving member of said transmission, a shaft journalled in said casing and forming the driven member of said transmission, a disc secured within said casing and formed with plunger races, a circular plate secured to said disc and having ports therethrough, an eccentric rigid on said shaft, an eccentric block mounted on said eccentric, plungers slidably connected to said eccentric block and slidable in said races, a lubricating liquid filling said casing, valves adjustably closing said ports, and means for feeding said liquid into said casing.

2. In a power transmission, a liquid-tight casing rotating with the crank shaft of an engine and forming the driving member of said transmission, a shaft journalled in said casing and forming the driven member of said transmission, a disc secured within said casing and formed with plunger races, a circular plate secured to said disc and having ports therethrough, an eccentric rigid on said shaft, an eccentric block mounted on said eccentric, plungers slidably connected to said eccentric block and slidable in said races, a lubricating liquid filling said casing, valves adjustably closing said ports, recesses formed in said casing, flexible diaphragms secured over said recesses at the edges thereof, and means for feeding said liquid into said casing.

Signed at the town of Smiths Falls, this 30th day of May, 1928.

LEONARD KEITH CHESWRIGHT.